Jan. 12, 1926.  1,569,514
G. McCLELLAN
SHOCKING AND STOOKING MACHINE FOR ATTACHMENT TO BINDERS
Filed Oct. 12, 1923  4 Sheets-Sheet 1

INVENTOR:
George McClellan
BY: Frederick C. Bromley
Atty.

Jan. 12, 1926.                                                    1,569,514
                         G. McCLELLAN
          SHOCKING AND STOOKING MACHINE FOR ATTACHMENT TO BINDERS
                      Filed Oct. 12, 1923              4 Sheets-Sheet 3

INVENTOR: George McClellan
BY: Frederick C. Bromley
        Atty.

Patented Jan. 12, 1926.

1,569,514

UNITED STATES PATENT OFFICE.

GEORGE McCLELLAN, OF TORONTO, ONTARIO, CANADA.

SHOCKING AND STOOKING MACHINE FOR ATTACHMENT TO BINDERS.

Application filed October 12, 1923. Serial No. 668,155.

*To all whom it may concern:*

Be it known that I, GEORGE MCCLELLAN, a subject of the King of Great Britain, and resident of 221 Carlton Street, in the city of Toronto, in the Province of Ontario, in the Dominion of Canada, have invented certain new and useful Improvements in Shocking and Stooking Machines for Attachment to Binders, of which the following is a specification.

The invention relates to certain new and useful improvements in shocking and stooking machines for attachment to binders as described in the present specification and shown in the accompanying drawings that form part of the same.

The invention comprises a machine possessed of its own running gear and which is adapted to be hitched to and alongside of the binder deck. When so connected the sheaves as they are ejected from the binder are precipitated into a tilting carriage or basket of the machine, whereupon a sufficient number of such sheaves being deposited therein a clutch is manually tripped which sets mechanism into motion to tie the sheaves forming a shock. Thence the carriage or basket is automatically tilted depositing same upright upon the ground in such a manner known to the art as "stooking".

The object of the invention is to provide a simple and efficient device of the class referred to, one which will be labour saving and durable.

Referring to the drawings.

Like numerals of reference indicate corresponding parts in each figure throughout the drawings.

In the drawings, the device comprises a substantially U-shaped frame of which 1 designates the front cross member thereof and 2 and 3 the rearwardly extending side members. The running gear includes a caster 4 connected to the aforesaid front cross member 1, a similar caster 5 likewise connected to said longitudinal member 2 which lies on the binder deck side, and a comparatively large wheel 6 disposed subjacent to said member 3 on the other side of the machine.

This wheel 6, hereinafter referred to as the driving wheel, is journaled by means of a short shaft 7 in outer and inner hangers 8 and 9 depending from the frame.

10 is the carriage or basket of an elongated rectangular shape, suitably reinforced at its top by a pair of diagonally extending braces; and having the front end and bottom thereof open. An opening is also provided above the frame on the binder deck side. Said carriage or basket is disposed in the aforesaid frame by means of aligned trunnions 11 and 12, which are situated slightly towards the front side of the longitudinal centre thereof and protrude outwardly from the frame so as to connect with mechanism hereinafter described.

Integral with or secured to the frame aforesaid are a pair of quadrants 13 and 14, one on each of the inner sides thereof; each of which comprises a curved plate of substantial radius, the centre on which such radius is taken being concentric with the aforesaid trunnions.

15 and 16 are a pair of gate sections, one being hingedly secured to each side of the aforesaid carriage or basket as at 17 and 18 respectively, and constitute a closure for the bottom thereof, such gate sections being of an arcuate cross section and extending the full length of such carriage or basket.

Affixed to and extending from each of said gate-sections are brackets 19 and 20 respectively, each of which bears a roller as at 21, which engages the respective quadrants aforesaid.

It will be evident from the foregoing that as the carriage or basket tilts forwardly towards a vertical position said rollers will travel on the arcuate plates of the quadrants thus retaining said gate sections in a closed position; but, upon the carriage attaining a nearly vertical position such rollers pass the extremities of their quadrants thereby allowing said gate sections to open.

22 are a second pair of gate sections, one section being hingedly secured to each vertical side of the front end of said carriage or basket, so as to form a closure for same. The hinge pins of each of such gate sections are extended upwardly and provided with an offset portion as at 23 integral with or secured thereto for the purpose of imparting circular motion. 24 are rods pivotally connected to and extending rearwardly from the respective offset portions 23 of said pins, and which have their opposite extremities connected to bell-cranks 25, such bell-cranks being provided with forwardly inclined extensions 26, so that upon the tilting of said carriage the same will contact with the frame aforesaid and thus cause said bell-cranks to partially rotate, which through their connections will open the gate sections 22 coincidently with disengagement of the rollers 21 of the bottom gate sections 15 and 16.

27 are rods other than those aforementioned pivotally connected at one of their ends to the respective bell-cranks aforesaid; the other ends thereof being pivotally connected to a second pair of bell-cranks 28 situated at the rear upper corners of the carriage. Each of said latter bell-cranks bears a rod 29 depending therefrom and pivotally connected to one of the bottom gate sections as at 30. It will be readily understood that with this construction the bottom gate sections 15 and 16 through their connections with the first mentioned bell-cranks 25 will be simultaneously actuated with the operation of the front end gate sections 22.

31 are a pair of comparatively long tension coil springs, one end of same being connected to each of the bottom gate sections and the other end thereof being connected to the carriage itself so that by their action the closure of the gates will be effected.

Figure 1:
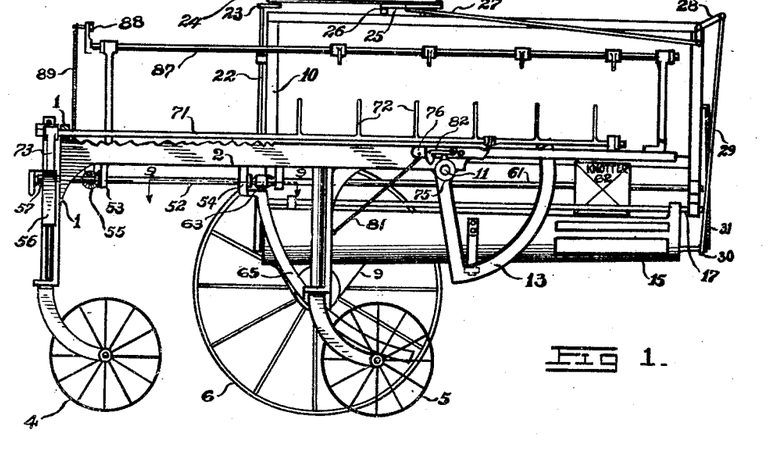
Figure 1 is a side elevation of the invention illustrating the side thereof adjacent to the binder deck.
Figure 2:
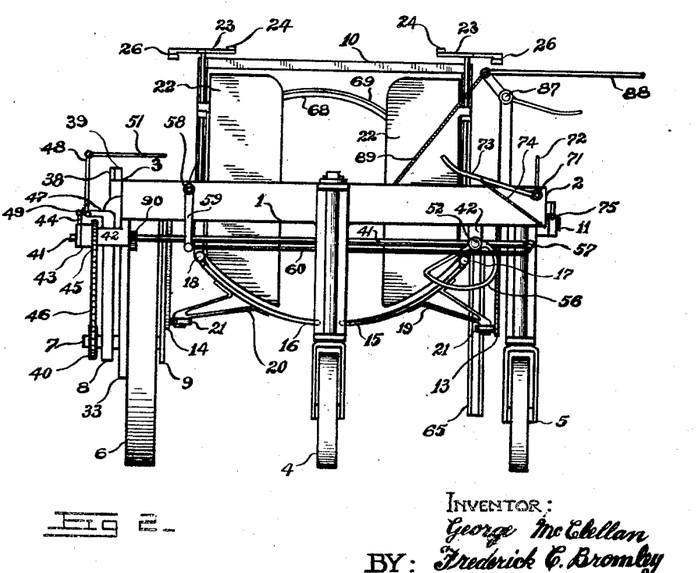
Figure 2 is a front view of the device.
Figure 3:
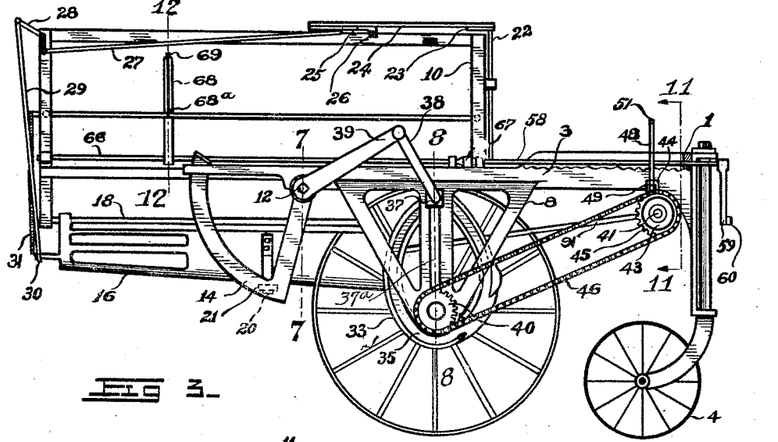
Figure 3 is a view of the other side of the machine.
Figure 4:
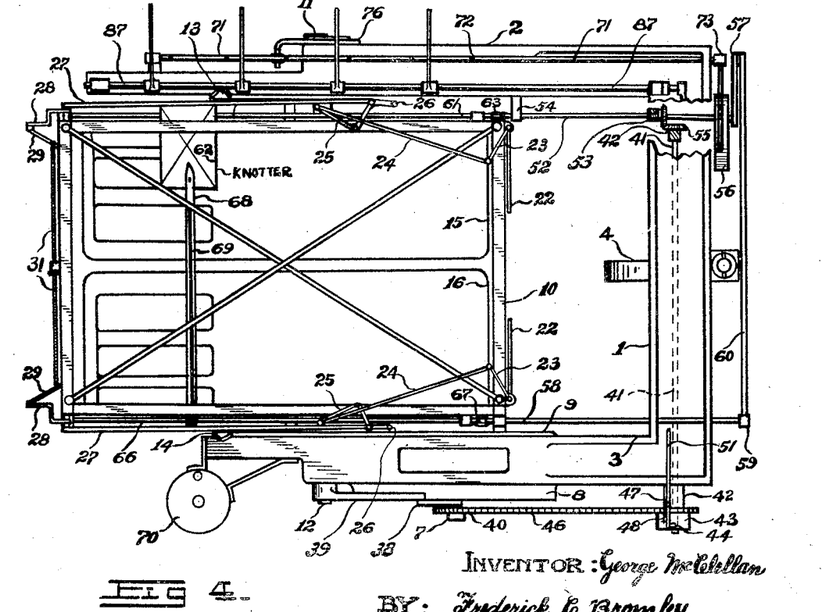
Figure 4 is a top plan view thereof.
Figures 5, 6:
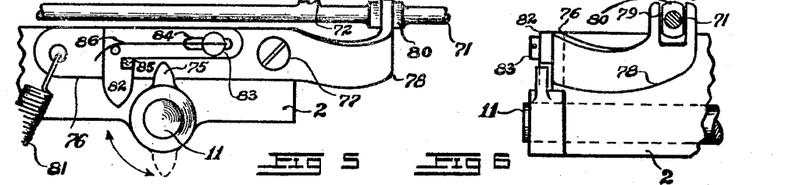
Figure 5 is an enlarged view of the mechanism for releasing a device which arrests the transition of the sheaves during the tilting of the carriage or basket.
Figure 6 is an end view of Figure 5.
Figures 7, 8:
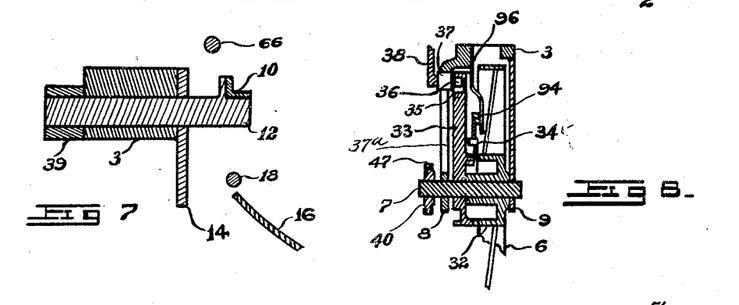
Figure 7 is a sectional view of one of the carriage trunnions taken on the line 7—7 of Figure 3.
Figure 8 is a cross sectional view taken on the line 8—8 of Figure 3 showing the comparatively large wheel which operates the several working parts.
Figure 9:
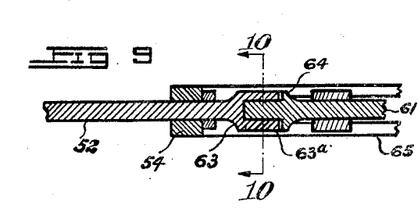
Figure 9 is a longitudinal sectional view of one of the interlocking shafts, taken on the line 9—9 of Figure 1.
Figure 10:
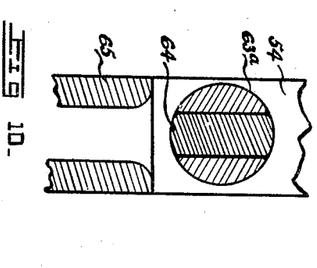
Figure 10 is a cross sectional view taken on line 10—10 of Figure 9.
Figures 13, 15, 16:
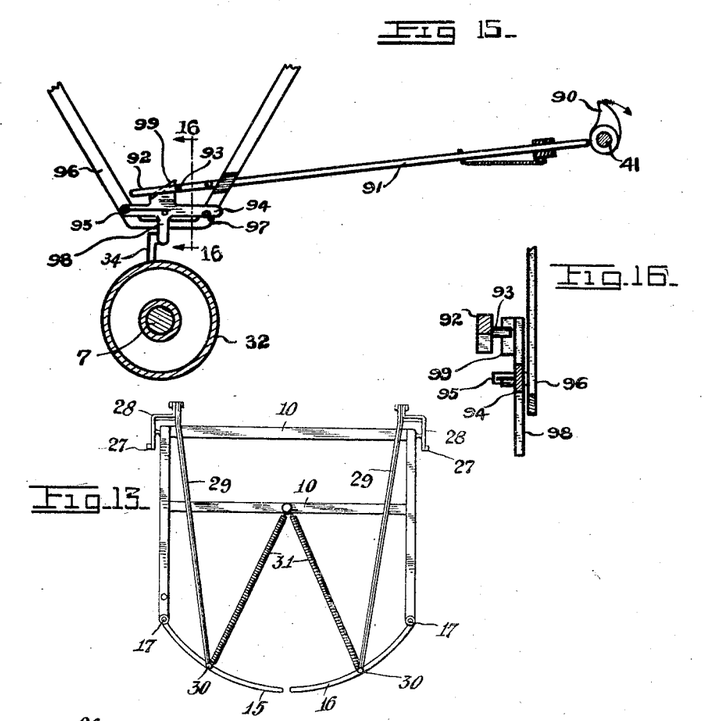
Figure 13 is a rear end view of the carriage or basket.
Figure 15 is a fragmentary view illustrating the mechanism for automatically actuating the driving wheel clutch.
Figure 16 is a cross sectional view taken on the line 16—16 of Figure 15.
Figure 14:
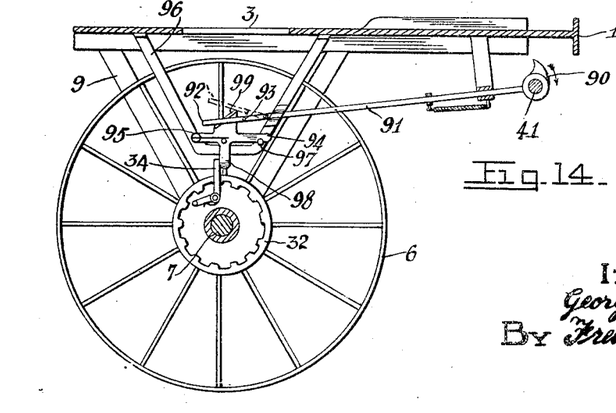
Figure 14 is a vertical view, partially in section, of the driving wheel with its clutch interior exposed and the automatic mechanism which operates the same shown suspended from the machine frame.

32 is a clutch (best discernible in Figures 8, 14 and 15) of a well known design and which is not shown in detail on account of it not constituting a feature of the invention. One section of this clutch is secured to the driving wheel 6 and the other section affixed to a comparatively large cam 33; a lever 34 projecting from the clutch section to which the cam 33 is connected effecting the engagement of the aforesaid clutch sections.

The cam 33 is provided with a groove 35 in the outer side thereof in which operates a roller 36. Said roller in turn is carried by a block 37 which operates in ways 37$^a$ integral with or secured to the outer hanger 8.

38 is a link pivotally connected at one end to said block 37 and at the opposing end to an arm 39, which is rigidly affixed to the protruding end of the trunnion 12 either by squaring same or other convenient means.

The clutch 32 through its connections, hereinafter to be more fully described, communicates one complete revolution to the cam 33 upon its manipulation. As the cam rotates during its first half revolution, the same through its connections with the link 38 and the arm 39 tilts the carriage forwardly through a quarter revolution bringing it to a vertical position. During the latter half revolution of such cam, the carriage is returned to the normal position thereof.

40 is a sprocket rigidly secured on the driving wheel shaft 7, so that rotation of such driving wheel will be transmitted thereto.

41 is a shaft transversely arranged at the front of the machine and suitably journalled in bearings integral with or secured to the frame thereof as at 42.

Figure 11:
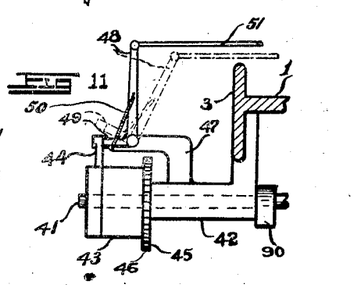
Figure 11 is an enlarged view of the clutch which operates the tying mechanism and the sheave arresting device, this view being taken on the line 11—11 of Figure 3.
Figure 12:
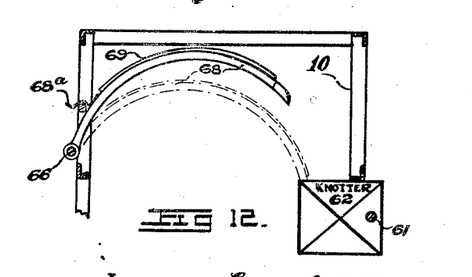
Figure 12 is a sectional view taken on the line 12—12 of Figure 3 illustrating the needle arm and knotting mechanism of the carriage or basket.

43 is a second clutch (best discernible in Figure 11) similar in design to the clutch 32 and is mounted on the outer end of said shaft 41 on the driving wheel side of the machine. The section of said clutch which is made fast to the shaft is possessed of an actuating lever 44, and the other section thereof is provided with a sprocket 45 in alignment with said sprocket 40. As both the clutches 32 and 43 including their levers are of identical construction, the illustration of the interior of the former, given in Figure 16, will serve to disclose the structure of both.

46 is a chain connecting the aligned sprockets 40 and 45 so that motion will be transmitted to the clutch section of the latter.

47 is a bracket extending over the clutch 43, in which is pivotally mounted a lever 48 having a short normal arm 49. 50 is a tension spring adapted to normally hold said lever so that the arm 48 thereof lies in the path of the clutch lever 44. 51 is a flexible element secured to the said lever 48 and extending therefrom to the operator of the binder for manipulation.

It will be manifest from the foregoing that to engage the clutch, which is of the type which operates upon the releasing of the lever thereof, it is simply necessary to pull on the flexible element 51 which effects angular movement of the lever 48, thus releasing the arm 49 thereof and permitting the clutch lever 44 to lock the clutch sections together. As said arm 49 assumes its normal position upon the releasing of the flexible element, such clutch lever 44 will contact therewith upon completion of the revolution thus redisengaging the clutch.

52 is a shaft extending longitudinally of the machine on the binder side thereof, lying between the side member 2 and the carriage; said shaft being journalled at its forward end in a bearing 53 and at its rearward end in a bearing 54.

55 designates a pair of meshing mitre gears affixed respectively to the shafts 41 and 52, and imparting motion therebetween.

56 is a cam rigidly affixed on the forward end of the shaft 52 in advance of the machine frame.

57 is a lever secured on said shaft 52 in front of said cam 56.

58 is a shaft disposed similar to the shaft 52 and on the opposite side of the machine frame. The forward end of such shaft 58 carries a lever 59 depending therefrom, which connects with the lever 57 by a bar 60.

61 is a knotter shaft extending coaxial with the shaft 52 and suitably journalled in bearings carried by the carriage aforesaid.

62 is the knotter disposed in and carried by the carriage, said knotter being connected to said shaft 61 and adapted to be actuated thereby to effect the tying of the shock. Such knotter may be of any customary type and is therefore merely designated in the drawings by a square.

In order to couple said aligned shafts 52 and 61 and yet permit same to separate when the carriage tilts, an interlocking device 63 is provided which consists in providing the shaft 52 with an enlarged bifurcated terminus as at 63ª, and an interfitting terminus 64 on the shaft 61 with flat sides adapted to neatly fit into such bifurcation. The angular position of the bifurcated terminus 63 is so predetermined that in its inert position the flat sides of the interfitting terminus 64 will be in a vertical plane thus allowing disengagement and re-engagement of the same.

Referring to Figures 1, 2, 9 and 10 of the drawings, to obviate the difficulty of accidental angular movement of the knotter shaft 61 which would preclude the re-engagement thereof, a guide 65 is provided comprising a spaced arcuated bars taken on a radius of the trunnions aforesaid. Said guide is supported at its upper end by said bearing 54 and towards its lower end by attachment to the caster 5 aforesaid. Upon the tilting of the carriage the interfitting terminus of said shaft engages in the bars thereof and is thereby prevented from turning.

66 is the needle shaft extending coaxial with the shaft 58 and suitably disposed in bearings integral with or secured to the carriage. Such shafts 66 and 58 are provided with an interlocking device 67 identical in construction to that of the interlocking device 63 and for the same purpose.

68 is the needle rigidly secured to the shaft 66 and curved upwardly therefrom, the extremity of which is the needle proper. 68ª is a spring catch adapted to effect the retention thereof when same is in an inert position. 69 is a channel disposed longitudinally on said needle and adapted to receive the twine for binding the shock. 70 is the container in which the supply of twine is held.

Having described the mechanism for tying the shock, the operation thereof will now be recounted. As the shaft 41 makes one complete revolution upon manipulation of the clutch 43 thereof a single revolution will likewise be transmitted to the shaft 52 through its connections therewith, which is sufficient to operate the knotter 62. Simultaneously the bar 60 is oscillated by the lever 57 effecting the partial rotation of the shaft 66 thus causing the needle 68 to be brought into and out of engagement with such knotter coincidently with the operation of the latter.

71 is a rack extending longitudinally of the machine and journalled in bearings on the binder side thereof, the forward end of such rack protruding beyond the frame of the machine.

72 are the prongs of such rack which are disposed at intervals therealong and interpose the carriage side-opening and the binder deck.

73 is a cam follower rigidly affixed to the protruding end of said rack and engageable with the cam 56.

74 is a spring secured to said cam follower at one end and at the other to the frame aforementioned, such spring being adapted to hold said rack so that the prongs thereof will lie in a normal inert position.

75 is a cam rigidly secured on the trunnion 11 in a normal vertical position.

76 is a locking bar pivotally affixed as at 77 to the frame member 2 above said cam 75; having its rear extremity inflexed and turned upwardly as at 78, such extremity being provided with a slot 79.

80 is an enlargement provided on said rack 71 having flat parallel sides disposed in the plane of the prongs 72 thereof; such enlargement being adapted to be engaged by said slotted extremity 78 of the locking bar 76 for the purpose of holding same in an erect position.

81 is a tension spring adapted to exert pressure on said locking bar 76 to hold same in engagement with the rack.

82 is a click secured to said locking bar 76 by a screw 83 and slidable longitudinally thereon by means of a slot 84.

85 is a pin projecting from said locking bar and received in a recess in said click 82. 86 is a flat spring projecting from said screw 83 and bearing on the free end of said click to hold same in contact with the pin 85.

It will be evident from the foregoing that concurrent with the rotation of the shaft 52 the rack 71 will be raised to an erect position through contact of the cam 56 with the follower 73. The rack is secured in that position automatically by the locking bar 76. The cam 75 rotates simultaneously with the tilting of the carriage passing the click 82 which recedes against its spring pressure upon contact therewith. When the cam returns with the carriage, the same again contacts with the aforesaid click which is elevated thereby, thus compelling the locking bar to release the rack and permitting said spring 74 to revert same back to an inert position.

87 is an auxiliary rack disposed above the rack 71 and is provided with an arm on the front end thereof, to which is secured a manually operated member 88 and a spring 89 to hold such rack in a normal position. This auxiliary rack is provided for the purpose of imparting an impulse to the sheaves should same become clogged in any manner during their transition.

Adverting to the mechanism for actuating the driving wheel clutch (best discernible in Figures 8, 14, 15 and 16), which comprises a cam 90 affixed to the shaft 41, a spring impelled follower 91 suitably journalled in bearings integral or secured to the machine frame: The end thereof opposing said cam is provided with a comparatively short terminus 92 pivotally connected to the follower proper and capable of upward movement. Such terminus bears a pin 93. A spring impelled pawl 94 is pivotally connected as at 95 to a bracket 96 which depends from the machine frame; the free end of such pawl resting upon a projection 97. Said pawl is provided with a finger 98 engaging the lever 34 of the clutch 32 and an oblique laterally projecting cam 99 disposed in the path of the pin 93 of the follower terminus 92.

In the operation of such clutch actuating mechanism, the rotation of the cam 90 imparts a rearward movement to the follower 91 bringing the pin 93 of the terminus 92 into engagement with the cam 99 and elevating the pawl 94, thus effecting the disengagement of the lever 34 from the finger 98 and permitting engagement of the clutch sections. Upon the return movement of the cam follower the pin 93 travels over the opposing side of the cam of the pawl eventually dropping into position again, ready for a repetition of the operation.

In the operation of this invention, the sheaves are precipitated from the binder into the carriage or basket 10 with their butt ends foremost, and when a sufficient number of same are received therein to compose a shock the operator pulls the flexible element 51. The manipulation of such flexible element effects the engagement of the clutch 43 through the levers 44 and 48 and as such clutch is continually driven by its connections with the driving wheel, motion is thus transmitted to the shaft 41. As the shaft 52 connects therewith by the mitre gears 55, motion is communicated thereto thus operating the knotter 62. Simultaneously the bar 60 is oscillated by the lever 57 carried by such shaft, thereby actuating the shaft 66 which in turn actuates the needle 68 inducing same to engage the sheaves and knotter coincidently with the operation of the latter, thus tying the sheaves and forming the shock. Simultaneously with the rotation of the shaft 52 the rack 71 is manipulated thereby through its connection with the cam 73, thus intercepting and arresting the flow of the sheaves.

Upon the nearly completed revolution of the shaft 41, the cam 90 actuates the follower 91 thereby engaging the clutch 32 through its connections with the lever 34 and the pawl 94. As the cam 33 is secured to such clutch the same is operated thereby, thus effecting the tilting of the carriage 10 through the link 38 and the arm 39 thereof.

As the carriage approaches a vertical position, the extension 26 of the bell-cranks 25 engage the machine frame, thus simultaneously opening the front gate sections 22 and the bottom gate sections 15 and 16 permitting the depositing of the shock upon the ground in an upright position, whereupon the carriage tilts back to its normal position and the several gate sections are automatically closed again. Concurrent with the carriage approaching a normal position the rack 71 is released by the trunnion cam 75 contacting with the click 82 which disengages the locking bar 76 from the enlargement 80 of such rack, whereupon sheaves are free to enter the carriage again for subsequent shocking and stooking.

What I claim is:—

1. In a device of the class described, a frame having suitable running gear, a carriage tiltably mounted therein and having an opening on the binder deck side to receive sheaves; gate sections disposed in the front end and bottom of said carriage, means to automatically open such gate sections when said carriage approaches a vertical position in tilting, and means to close such gate sections as the carriage reverts back to a normal position again; a knotter and a needle oppositely disposed in said carriage; manually operable means connected to said running gear adapted to actuate said knotter and needle to effect the tying of the sheaves, and means actuated by such running gear to effect the tilting of said carriage upon the tying of the sheaves.

2. In a device of the class described, a substantially U-shaped frame comprising a front cross member, side members rearwardly extending therefrom having bearings receptive to carriage trunnions; a running gear comprising a caster connected to said front cross member of said frame, a second caster similarly connected to one of said side members thereof, and a comparatively large driving wheel rotatably mounted in hangers depending from the opposing side members thereof; a carriage tiltably mounted in said frame and having an opening on the inner deck side to receive sheaves, gate sections disposed in said carriage, means to automatically open such gate sections as said carriage approaches a vertical position in tilting and means to close such gate sections as said carriage reverts back to a normal position again, a knotter and needle oppositely disposed in said carriage, manually operable means connected to said running gear adapted to actuate said knotter and needle, and means actuated by said running gear to effect the tilting of the carriage.

3. In a device of the class described, a frame, a running gear therefor, an elongated rectangular carriage tiltably mounted in said frame by means of trunnions and having the front end and bottom thereof open, and an opening other than the aforesaid disposed therein above said frame constituting an ingress for the sheaves; a pair of gate sections hingedly secured in said bottom opening, a pair of gate sections similarly secured in said front end opening; means to automatically open such gate sections when said carriage approaches a vertical position in tilting and means to close such gate sections as the carriage reverts back to a normal position again; a knotter and needle oppositely disposed in said carriage, manually operable means connected to said running gear adapted to actuate said knotter and needle, and means actuated by said running gear to effect the tilting of the carriage.

4. In a device of the class described, a frame, a running gear therefor, a carriage tiltably mounted on said frame having a pair of front end gate sections and a pair of bottom gate sections, hinge pins extending upwardly from such front end gate sections and each provided with an offset portion, rods pivotally connected to such offset portions and extending rearwardly therefrom, bell-cranks connected to said rods respectively and having extensions adapted to contact with said frame upon the tilting of the carriage, rods other than the aforesaid connected to said bell-cranks respectively, bell-cranks other than the aforesaid connected to said last mentioned rods and possessing depending rods connected at their respective lower ends to said bottom gate sections, and springs exerting pressure on such bottom gate sections to close same; means to retain said bottom gate sections in a closed position, a knotter and needle oppositely disposed in said carriage, manually operable means connected to said running gear to actuate said knotter and needle, and means actuated by said running gear to effect the tilting of the carriage.

5. In a device of the class described, a frame, a running gear therefor, a carriage tiltably mounted in said frame having a pair of front end gate sections and a pair of bottom gate sections, means to automatically open such gate sections when said carriage approaches a vertical position in tilting and means to close such gate sections as the carriage reverts back to a normal position again, quadrants, one of which is affixed to each side of said frame, interposing the carriage, brackets affixed to said gate sections respectively and extending toward said quadrants, rollers rotatably secured in such brackets and engaging said quadrants respectively, a knotter and needle oppositely disposed in said carriage, manually operable means connected to said running gear to actuate said knotter and needle, and means actuated by said running gear to effect the tilting of the carriage.

6. In a device of the class described, a frame, a running gear therefor, a carriage tiltably mounted on said frame, a transverse shaft journalled in bearings in said frame, a clutch secured on said shaft, means to transmit power from said running gear to said clutch, manually operable means adapted upon manipulation to effect engagement of said clutch for a period of one revolution, a shaft connected to the aforesaid shaft by meshing bevel gears, a knotter shaft, an interlocking device connecting said knotter shaft to the second mentioned shaft, a knotter, a needle; means adapted to operate said needle coincidently with said knotter, and means actuated by said running gear to effect the tilting of the carriage.

7. In a device of the class described, a frame, a running gear therefor comprising a driving wheel having a sprocket, a carriage tiltably mounted on said frame, a transverse shaft journalled in bearings in said frame, a clutch secured on said shaft bearing a sprocket, a chain connecting said driving wheel sprocket to said clutch sprocket; manually operable means adapted on manipulation to effect engagement of said clutch for a period of one revolution, a shaft connected to the aforesaid shaft by meshing bevel gears, a knotter shaft, an interlocking device connecting said knotter shaft to the second mentioned shaft, a knotter, a needle, means adapted to operate said needle coincidently with said knotter, and means actuated by said running gear to effect the tilting of the carriage.

8. In a device of the class described, a frame, a running gear therefor, a carriage tiltably mounted in said frame, a transverse shaft journalled in bearings in said frame, a clutch secured on said shaft having a lever, means to transmit power from said running gear to said clutch, a spring impelled lever pivotally supported on said frame and having an arm adapted to lie in the path of the clutch lever, a flexible element connected to the aforesaid spring impelled lever and extending to the binder, a shaft connected to said shaft by meshing bevel gears, a knotter shaft, an interlocking device connecting said knotter shaft to the second mentioned shaft, a knotter, a needle, means adapted to operate said needle coincidently with said knotter, and means actuated by said running gear to effect the tilting of the carriage.

9. In a device of the class described, a frame, a running gear therefor, a carriage tiltably mounted in said frame, a transverse shaft journalled in bearings in said frame, a clutch secured on said shaft, means to transmit power from said running gear to said clutch, manually operable means adapted upon manipulation to effect engagement of said clutch for a period of one revolution, a shaft connected to the aforementioned shaft by meshing bevel gears and bearing a lever, a knotter shaft connected to said last mentioned shaft by an interlocking device, a knotter, a needle, a needle shaft, a shaft other than those aforesaid connected to said needle shaft by an interlocking device and bearing a lever which is pivotally connected by a bar to said lever of the second mentioned shaft, and means actuated by said running gear to effect the tilting of the carriage.

10. In a device of the class described, a frame, a running gear therefor, a carriage mounted in said frame, a transverse shaft journalled in bearings in said frame, a clutch secured on said shaft, means to transmit power from said running gear to said clutch, manually operable means adapted upon manipulation to effect engagement of said clutch for a period of one revolution; a shaft connected to the aforesaid shaft by meshing bevel gears and having one end bifurcated and also bearing a lever; a knotter shaft having an interfitting terminus adapted to engage the bifurcated end of said last mentioned shaft, a guide adapted to receive the interfitting terminus of said knotter upon the tilting of the carriage, a knotter, a needle bearing a spring catch, a needle shaft having an interfitting terminus, a shaft having a bifurcated end engaging the interfitting terminus of said needle shaft in the normal position of the carriage and bearing a lever which in turn is pivoted to said lever of said second mentioned shaft, and means actuated by said running gear to effect the tilting of the carriage.

11. In a device of the class described, a frame, a running gear therefor, a carriage tiltably mounted in said frame, a transverse shaft journalled in bearings in said frame, a clutch secured on said shaft, means to transmit power from said running gear to said clutch, manually operable means adapted upon manipulation to effect engagement of said clutch for a period of one revolution, a shaft connected to the aforesaid shaft by meshing bevel gears; a knotter and needle, means adapted to simultaneously operate said knotter and needle upon the rotation of said last mentioned shaft, a rack adapted to arrest the transition of the sheaves, means actuated by said last mentioned shaft to raise said rack coincidently with the operation of said knotter and needle, and means actuated by said running gear to effect the tilting of the carriage.

12. In a device of the class described, a frame, a running gear therefor, a carriage tiltably mounted in said frame, a transverse shaft journalled in bearings in said frame, a clutch secured on said shaft, means to transmit power from said running gear to said shaft, manually operable means adapted upon manipulation to effect engagement of said clutch for a period of one revolution, a shaft connected to said shaft by meshing bevel gears, a knotter and a needle, means adapted to simultaneously operate said knotter and needle upon the rotation of said last mentioned shaft, a rack adapted to arrest the transition of the sheaves, a cam follower secured on said rack, a cam secured on said last mentioned shaft and adapted to simultaneously raise said rack coincidently with the operation of said knotter and needle, and means actuated by said running gear to effect the tilting of the carriage.

13. In a device of the class described, a frame, a running gear therefor, a carriage tiltably mounted on said frame by means of trunnions, a transverse shaft journalled in bearings in said frame, a clutch secured on said shaft, means to transmit power from said running gear to said clutch, manually operable means adapted upon manipulation to effect engagement of said clutch for a period of one revolution, a shaft connected to the aforesaid shaft by meshing bevel gears, a knotter and needle, means adapted to simultaneously operate said knotter and needle upon the rotation of said last mentioned shaft, a spring impelled rack, means actuated by said last mentioned shaft to raise said rack coincidently with the operation of said knotter and needle, means to lock said rack and release it as the carriage approaches a normal position in tilting, comprising a cam secured on one of said carriage trunnions, a spring impelled locking bar pivotally secured on said frame and having a bifurcation engageable with a flat sided enlargement integral with said rack, and a spring pressed click engageable with said cam; and means actuated by said running gear to effect the tilting of the carriage.

14. In a device of the class described, a frame, a running gear therefor including a driving wheel, a clutch secured on said driving wheel, a cam secured to said clutch, a carriage tiltably mounted in said frame by means of trunnions, an arm affixed to one of said trunnions, a link connected to said arm, a slidable block connected to said link and having a roller which engages said cam, and means to actuate said clutch to effect the tilting of the carriage.

15. In a device of the class described, a frame, a running gear therefor including a driving wheel, a clutch secured on said driving wheel, a cam secured to said clutch, a carriage tiltably mounted on said frame by means of trunnions, an arm affixed to one of said trunnions, a link connected to said arm, a slidable block connected to said link and having a roller which engages said cam; a transverse shaft journalled in bearings on said frame and having a clutch secured thereon; means to transmit power from said driving wheel to said transverse shaft clutch, manually operable means adapted upon manipulation to effect engagement of said transverse shaft clutch for a period of one revolution, a shaft connected to the aforesaid shaft by meshing bevel gears, a knotter and needle, means adapted to simultaneously operate said knotter and needle upon the rotation of said last mentioned shaft, means adapted to effect engagement of said driving wheel clutch simultaneously with the completion of the operation of said knotter, comprising a cam secured on said transverse shaft, a spring impelled cam follower journalled in said frame and having a short pivoted terminus which bears a pin, a spring pressed pawl having an oblique cam and a finger disposed in the path of the lever of said driving wheel clutch.

Signed at Toronto, Canada, this eighth day of October, 1923.

GEORGE McCLELLAN.